United States Patent [19]

Call

[11] 4,290,688

[45] Sep. 22, 1981

[54] APPARATUS FOR COLLECTING MARKET SURVEY DATA FROM UNIVERSAL PRODUCT TYPE CODED ITEMS

[76] Inventor: James Call, 8 Soundview Dr., Larchmont, N.Y. 10538

[21] Appl. No.: 970,986

[22] Filed: Dec. 19, 1978

[51] Int. Cl.³ .................. G03B 17/24; G03B 27/00
[52] U.S. Cl. ............................. 355/1; 346/107 R; 354/106
[58] Field of Search .................. 355/1; 346/107 R; 340/146.3 Z; 354/4, 106

[56] References Cited

U.S. PATENT DOCUMENTS

| | | | |
|---|---|---|---|
| 1,144,267 | 6/1915 | Sickle et al. | 354/354 |
| 1,272,635 | 7/1918 | De Marco | 354/354 X |
| 1,323,364 | 12/1919 | Hood | 354/160 X |
| 2,724,310 | 11/1955 | Paine | 354/150 X |
| 2,982,175 | 5/1961 | Eisler | 346/107 R |
| 3,029,717 | 4/1962 | Hilderbrandt | 354/106 |
| 3,449,046 | 6/1969 | White | 355/1 |
| 3,512,861 | 5/1970 | Schackert | 355/1 |
| 3,688,665 | 9/1972 | Herden | 354/150 X |

*Primary Examiner*—John Gonzales
*Attorney, Agent, or Firm*—Hubbell, Cohen, Stiefel & Gross

[57] ABSTRACT

A method and apparatus for collecting market survey data from universal product type code bearing market items is provided in which a lenseless data recorder is employed for collecting the universal product type code encoded market data. The data recorder comprises a housing with the housing having an exposure aperture therein for admitting a source of light therethrough, such as ambient light or artificial light. A photographic recording medium, such as a film having photographic emulsion on opposite sides thereof to permit recording on both sides, is disposed in the housing adjacent the exposure aperture. The exposure aperture is optically alignable with the universal product type code on a market item for which the survey data is to be collected. A keyboard is provided in the housing for enabling the insertion of ancillary market survey information corresponding to the market item whose product code has been recorded. Fiber optics may be employed with the recorder for facilitating the recording of both the ancillary and product code information, with the recording being accomplished on both sides of the film. The developed film may be electronically scanned and the information subsequently stored in a data processor for analysis.

11 Claims, 16 Drawing Figures

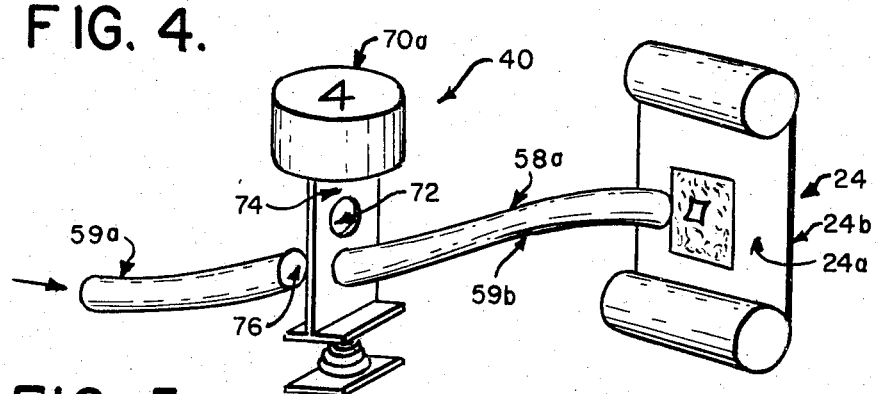
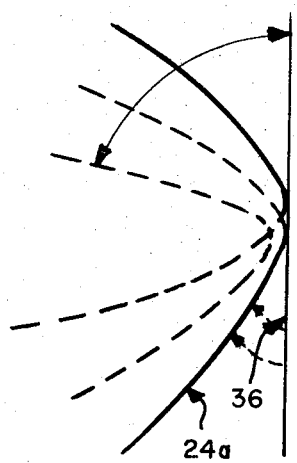
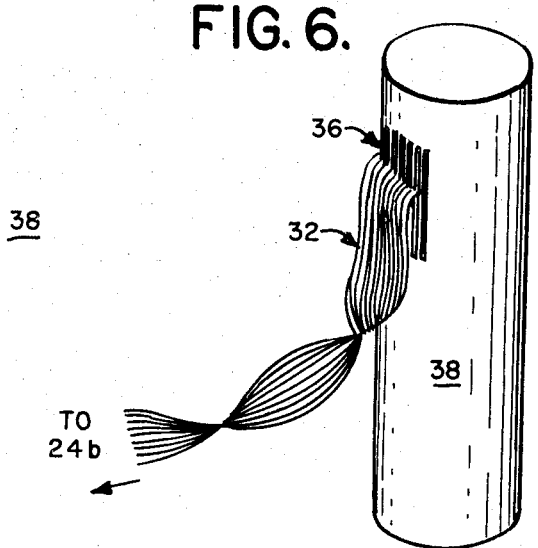
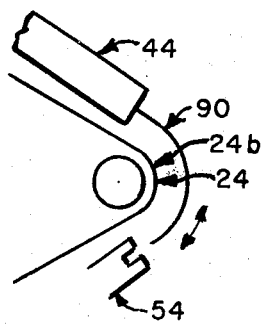
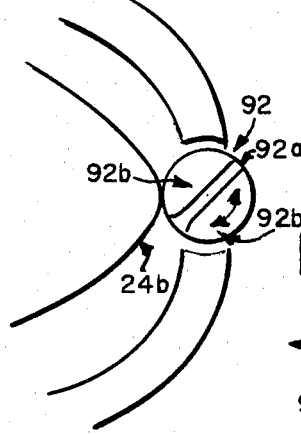
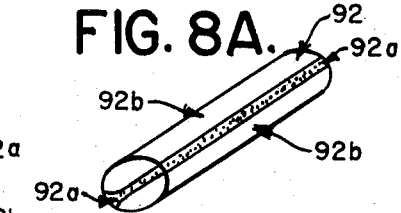
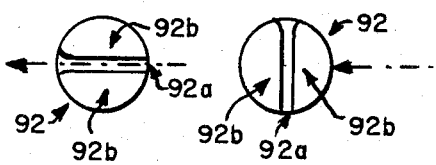
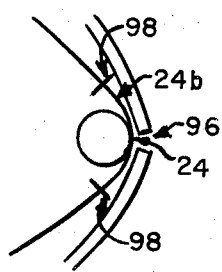
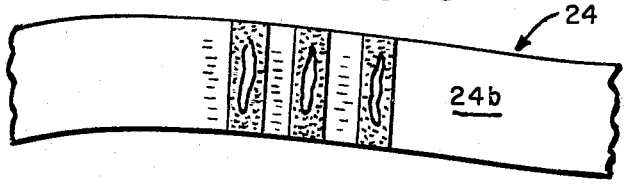

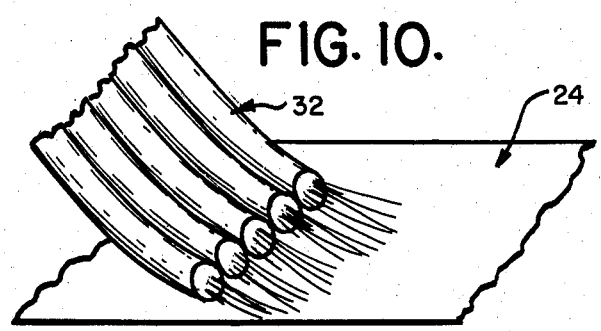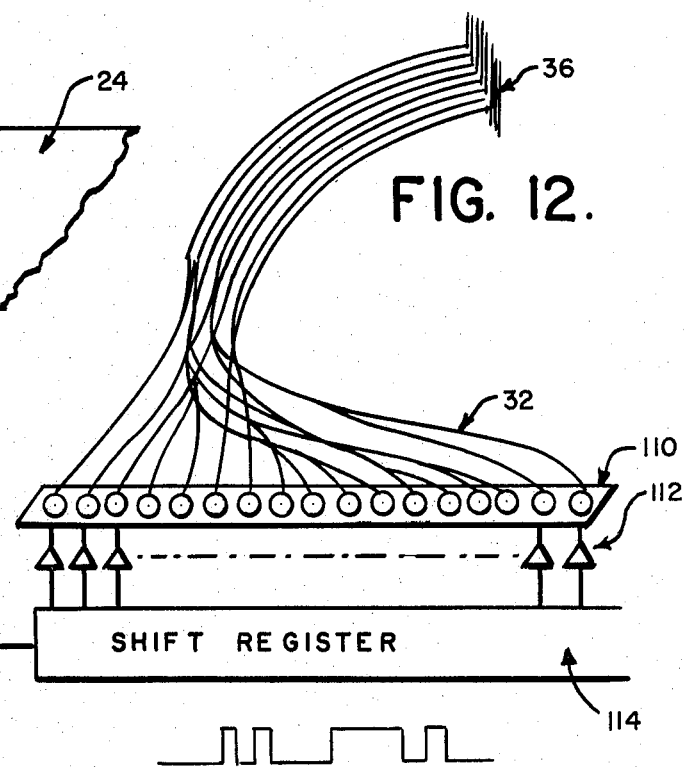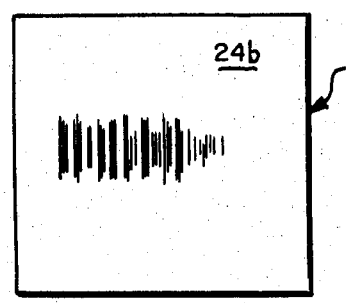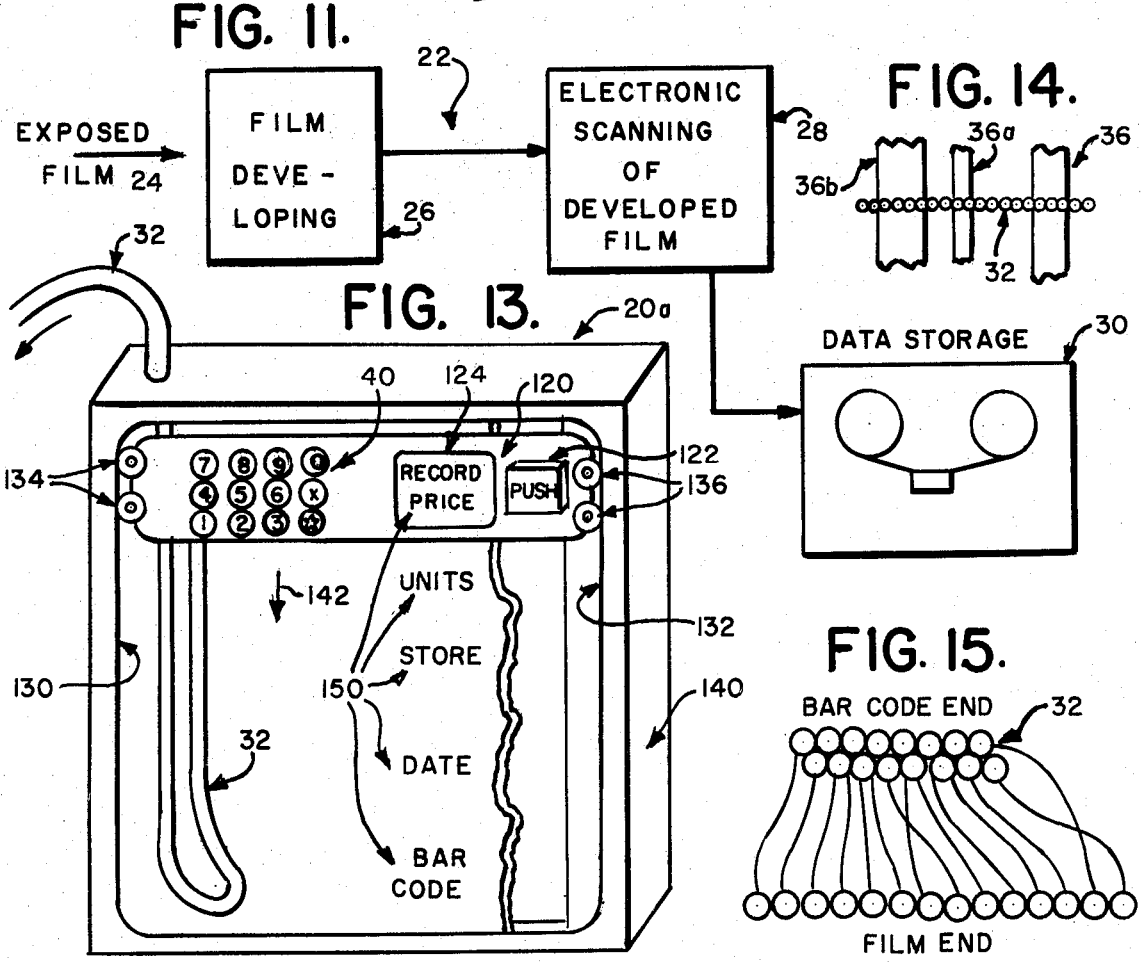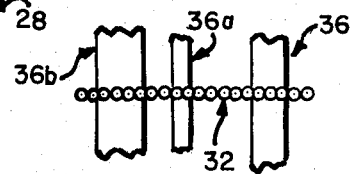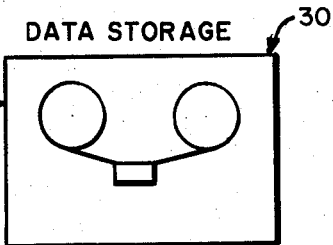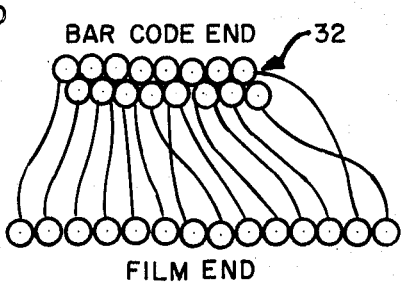

APPARATUS FOR COLLECTING MARKET SURVEY DATA FROM UNIVERSAL PRODUCT TYPE CODED ITEMS

BACKGROUND OF THE INVENTION

1. Field of the Invention

The present invention relates to methods and apparatus for collecting market survey data and particularly to such methods and apparatus for collecting such data from universal product type coded market items.

2. Description of the Prior Art

Market survey, or market research data has traditionally been recorded for analysis and business purposes by conventionally writing this data down by hand including the units, price, quantity and description of the various market items of interest. This information must then be mailed to the market survey organization where the handwritten data is then keypunched or encoded or optically scanned to be reduced to computer compatible data for subsequent analysis. In recent years, universal product codes, which are bar type codes, have been introduced to the market and appear on many packages and containers with the primary purpose of such codes looking to the future for electronic inventory control and pricing which has been experimentally tried in selected supermarket chains in the United States. This universal product code type information contains unique information from which the manufacturer, size, type, brand, and so forth, of a given market item can be deduced. In addition, other kinds of bar codes and descriptive markings are commonly applied to packages, containers, etc. for the goods or market items.

Traditionally, the universal product type code, which shall be used generically herein for all types of bar codes containing product or market information, has been collected and recorded by optical scanning in which a light sensitive probe is moved across the universal product type code to produce an analog output signal which is subsequently acted upon, such as by a microprocessor or computer, to produce the equivalent machine information corresponding to the universal product type code. In addition, laser beam scanners have also been employed to collect information from such universal product type codes. However, in either event, such prior art systems employ expensive and complex electronics. Nevertheless, these prior art systems still can produce errors due to variations in the speed of movement of the probe across the code when collecting the data. In solving such problems, even more complex microcomputer based systems have been required. While such complex systems have been successfully employed in large retail establishments to obtain such data for these establishments, they have not been successfully employed in the home by the consumer so as to provide market survey data for purposes of market research. One of the primary reasons for this is the complexity and cost of providing such individual units to a market survey panel which may typically consist of several hundred, or even thousands, of members. Nevertheless, efforts have been and are being made to upgrade the manner in which market survey information is collected so as to improve the speed and reliability of such collection in as economical and efficient manner as possible.

As will be described in greater detail hereinafter, the present invention attempts to overcome these problems of the prior art by employing a lenseless data recorder for universal product type code encoded market data in which the information is recorded on a photographic recording medium by reflective photographic recording of the universal product type code data on the medium for the market item in response to the reflection of the image of the universal product type code on to the medium through an exposure aperture when exposed to a light source, such as ambient light, with the further provision of ancillary market survey data on the photographic recording medium corresponding to the market item by direct photographic recording of this ancillary data on to the photographic recording medium. To applicant's knowledge, such lenseless type cameras have not been used in connection with the recording of market survey data, although lenseless cameras in general are known in the art, such as disclosed in U.S. Pat. No. 1,323,364 in which the information is photographically recorded by marking on a translucent writing surface adjacent the piece of photographic film. Another prior art system for recording information without a lens is disclosed in U.S. Pat. No. 2,724,310 although such a system is unsatisfactory for use in collecting market survey type information. As will also be described in greater detail hereinafter, the data recorder of the present invention is preferably arranged in a hand held gun form for convenience and, in this regard, it should be noted that there have been prior art gun cameras, such as disclosed in U.S. Pat. Nos. 1,144,267; 1,272,635 and 3,688,665, by way of example. However, none of the prior art gun cameras known to applicant, all of which have lenses, are in any way similar to the present invention for collecting market survey data.

SUMMARY OF THE INVENTION

A method and apparatus for collecting market survey data from universal product type code bearing market items is provided in which a lenseless data recorder is employed for collecting the universal product type code encoded market data. The data recorder comprises a housing with the housing having an exposure aperture therein for admitting a source of light therethrough, such as ambient light or artificial light. A photographic recording medium, such as a film having photographic emulsion on opposite sides thereof to permit recording on both sides, is disposed in the housing adjacent the exposure aperture. Means are provided for controllably advancing the photographic recording medium past the exposure aperture for optically aligning a different predetermined portion of the photographic recording medium with the exposure aperture each time the medium is advanced. The exposure aperture is optically alignable with a universal product type code on a market item for which the survey data is to be collected. Means are provided for enabling reflective photographic recording of the universal product type code data on the medium for the market item in response to the reflection of the image of the universal product type code on to the medium through the exposure aperture when exposed to the light source. This enabling means may comprise fiber optics, such as a flexible bundle of fiber optics, and a shutter which is operated in conjunction with the medium or film advance mechanism. The data recorder is preferably provided in a hand holdable gun configuration with a trigger being provided for simultaneously actuating film advance and shutter movement.

The data recorder also preferably includes a keyboard, which is preferably provided in the housing, for enabling insertion and photographic recording to ancillary market survey data, such as quantity, price, and the type of deal, on the photographic recording medium corresponding to the market item for which the universal product type code information is to be recorded, with this ancillary information preferably being recorded adjacent the recorded universal product type code information, such as on the opposite side of the recording medium. The keyboard preferably contains a plurality of keys each capable of providing a unique photographically recordable code designation image to the recording medium for selectively inserting the ancillary data to be recorded thereon. The ancillary data is preferably directly recorded on to the recording medium by direct photographic recording of the selectively inserted code designation images on to the medium when exposed to the light source. The ancillary data recording portion of the data recorder may also include a second bundle of fiber optics optically alignable between the ancillary data code image producing keys and the photographic recording medium when exposable to the light source through the exposure aperture for directly photographically recording selectively inserted corresponding ancillary data. In addition, means may be provided for enabling insertion of this ancillary data corresponding to different market survey parameters at different defined positions on the photographic recording medium. In such an instance, the keyboard may include prompting indicator means for alerting the user of the keyboard to a predetermined sequence of insertion and recording of the market survey data on the photographic recording medium.

After the data has been photographically recorded, the roll of film or medium is removed from the data recorder and developed. The developed film is preferably electronically scanned, such as by providing a video image of the developed data or by the use of fiber optics, and converted either into electronic signals which are subsequently stored electronically in the static memory of a data processor, such as a microcomputer, where they are subsequently analyzed and interpreted in accordance with a pre-programmed control format.

BRIEF DESCRIPTION OF DRAWINGS

FIG. 4 is a diagrammatic illustration of a typical ancillary data key and its relationship to the photographic recording medium of the data recorder of FIG. 1;

FIG. 5 is a diagrammatic illustration of the reflective photographic recording method of the data recorder of FIG. 1;

FIG. 6 is a diagrammatic illustration of the use of the fiber optics of the data recorder of FIG. 1;

FIGS. 7–9a are diagrammatic illustrations of various shutter arrangements which may used with the data recorder of FIG. 1;

FIG. 10 is a diagrammatic illustration of the use of an exposure gradient in connection with the fiber optics of the data recorder of FIG. 1;

FIG. 10A is a graphic illustration of an example of a universal product type code recording on the photographic medium employed in the data recorder of FIG. 1;

FIG. 11 is a block diagram of the preferred method of the present invention;

FIG. 12 is a diagrammatic illustration of a method of electronic analysis of the collected market survey data for use with the method illustrated in FIG. 11;

FIG. 13 is a diagrammatic illustration of another embodiment of the data recorder of FIG. 1;

FIG. 14 is a diagrammatic illustration of the manner in which the fiber optics of the data recorder of FIG. 1 can transmit bar coded information; and FIG. 15 is a diagrammatic illustration of the manner in which the fiber optics in the data recorder of FIG. 1 may be arranged for increased resolution.

DETAILED DESCRIPTION OF PREFERRED EMBODIMENTS

Figure 1:
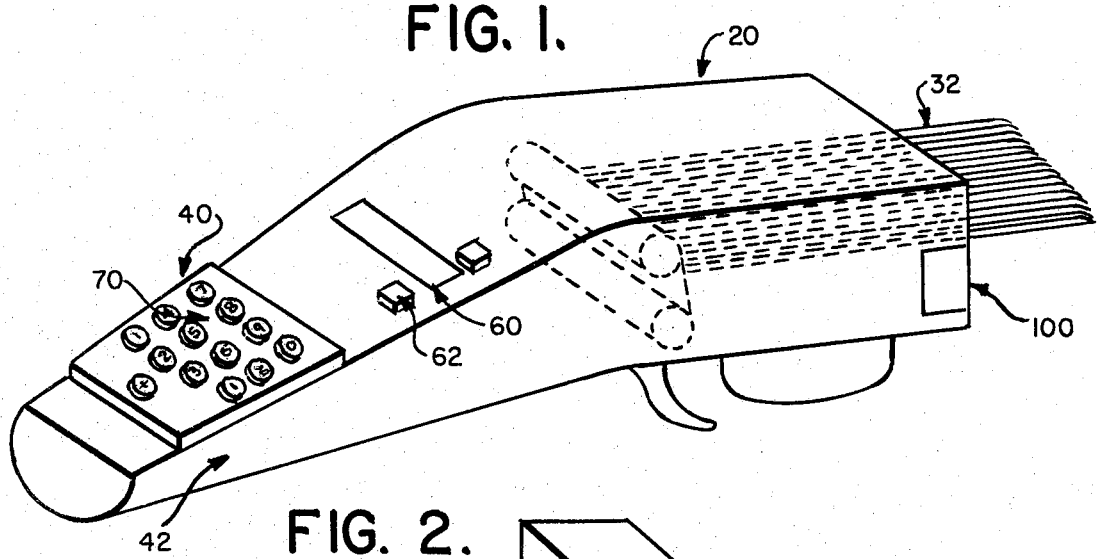
FIG. 1 is a perspective view of the presently preferred embodiment of the lenseless data recorder for use in the market survey data collection system of the present invention.

Referring now to the figures in detail and initially to FIG. 1, the market survey data collection system of the present invention preferably includes a market survey data recorder, generally referred to by reference numeral 20 in FIG. 1, which may be hand held as is the embodiment illustrated in FIG. 1, or wall-mounted as is the embodiment illustrated in FIG. 13, and the data reduction and analysis sytem, generally referred to by reference numeral 22 in FIG. 11. The data reduction and analysis system 22 is preferably used to develop the photographic storage media 24 (FIG. 3) employed to record the market survey data, to scan it electronically and to produce an output in a computer readable format which is then conventionally stored. This general arrangement is illustrated in FIG. 11 with the film developing step being represented by the block having reference numeral 26, the electronic scanning step being represented by the block having reference numeral 28 and the data storage step being represented by the block having reference numeral 30.

Figure 2:
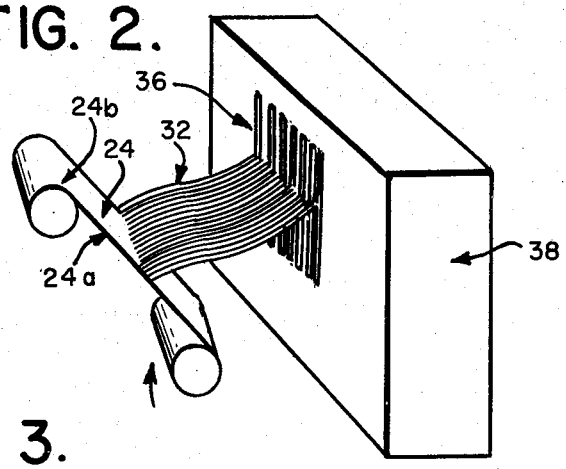
FIG. 2 is a diagrammatic illustration of the frontal details of the fiber optics and their relationship to the photographic recording medium in the data recorder of FIG. 1.

Preferably, the data recorder 20 includes a fiber optic ribbon or coherent sheet of fiber optics 32, such as No. 41225 commercially available from Edmund Scientific Co., Barrington, N.J., and illustrated on page 59 of Edmund's 1978 catalog. The fiber optics 32 preferably transmit light from a bar code, such as preferably the conventional universal product type code appearing on merchandise, including both the light and dark areas, in parallel paths over to one face 24b of the photographic emulsion 24 which is located inside the recorder 20 housing. This arrangement is graphically illustrated in FIGS. 2 and 3 in which FIG. 2 illustrates the relationship between the fiber optics 32 and the photographic emulsion 24 to transmit or convey the image of the universal product type bar code 36 from the product 38 to the appropriate face or side 24b of the photographic emulsion 24 located inside the data recorder 20 housing to enable recording of the image of the bar code 36 on the photographic emulsion 24 on the front side 24b thereof. In addition, as shown and preferred in FIGS. 1 and 3, the data recorder 20 also preferably has a keyboard 40 for preferably enabling insertion of ancillary market survey data onto the back side 24a of the storage medium 24 with, as previously mentioned, the universal product type code being recorded on the front side 24b.

Preferably, the same photographic emulsion is present on the back side 24a as is present on the front side 24b so as to enable the same type of photographic recording thereon, although the actual recording is done reflectively on the front side 24b and directly on the back side 24a. The keyboard 40 preferably includes keys 70 marked with the numerics 0 through 9, as well as with different market survey parameters, such as quantity, price, type of deal, etc. As is described in greater detail hereinafter with reference to FIG. 4, each of the keys 70 of the keyboard 40 preferably has a unique recordable image associated therewith so that the type of information recorded can be appropriately deciphered and interpreted after the photographic emulsion 24 is developed, electronically scanned and analyzed.

Figure 3:
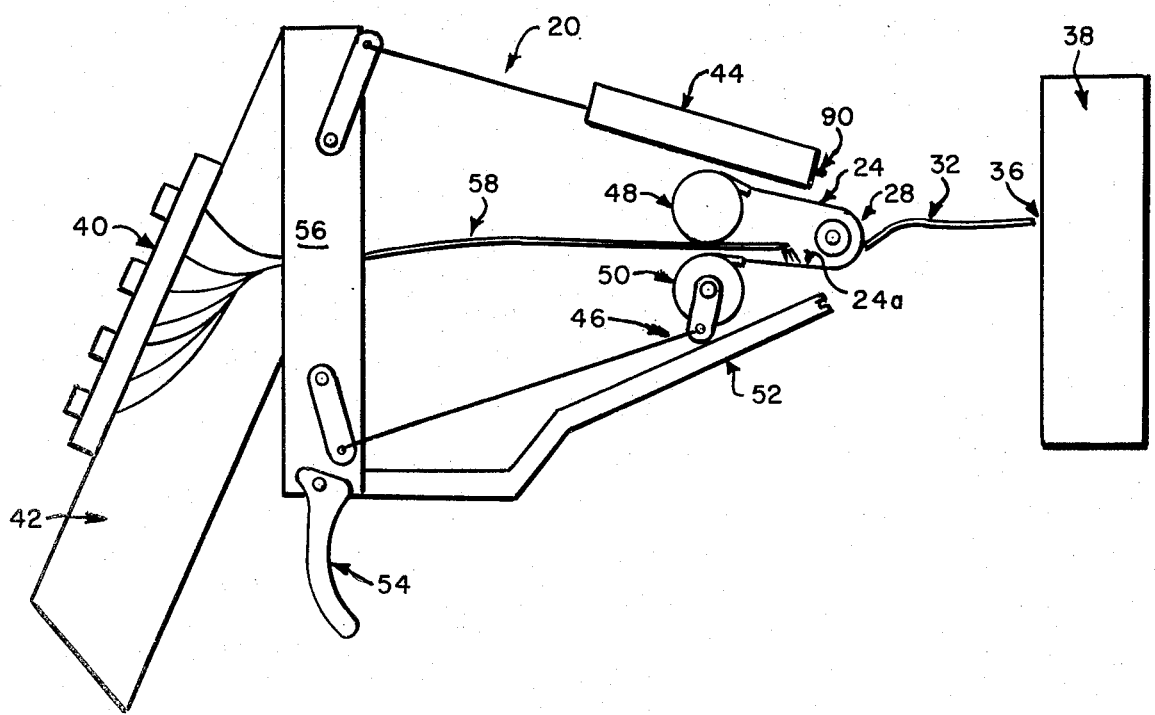
FIG. 3 is a diagrammatic illustration of the internal operation of the data recorder of FIG. 1.

As shown and preferred in FIG. 3, the data recorder 20 preferably includes a handle portion 42 in which the keyboard 40 is preferably located, a shutter mechanism 44 to be described in greater detail hereinafter, a film advance mechanism 46 comprising a conventional dispensing magazine 48 for the film, a conventional take-up magazine 50 for the film 24, a shutter receiver 54 for the shutter 44, a trigger mechanism 54 which through conventional gearing in a gear box 56 enables the trigger 54 to simultaneously actuate both the shutter 44 and the film advance mechanism 46 and, as will be described in greater detail hereinafter, a second bundle of fiber optics 58 similar to the first bundle 32 for enabling direct recording of the keyboard 40 input on the back side 24a of the storage medium 24.

In order to operate the data recorder 20, which also preferably includes a prompting display 60 which is mechanically advanced by a conventional switch and gearing arrangement 62, the user merely presses the end of the fiber optic ribbon 32 against the bar code 36 to be recorded and while holding it against the bar code 36, pulls the trigger 54 of the recorder 20. This operates the shutter mechanism 44 to open the shutter allowing light, such as ambient light, to travel through the fiber optics 32 and impinge upon the front side 24b of film 24 thus reproducing the pattern of the bar code as illustrated in FIG. 10A. The photographic recording of this data is termed reflective photographic recording as illustrated in FIG. 5 since the ambient light is picked up as reflected ambient light off the bar code 36 and the image of the bar code 36 is reflected from the surface of the market item 38 onto the front side 24b of the film 24 where it is photographically reproduced.

Upon releasing the trigger 54, the storage medium 24 is advanced by the conventional film advance mechanism 46 to provide a fresh emulsion portion adjacent the fiber optics 32 for recording of the next image. It should be noted that preferably shutter 44 is closed during this film advance. Prior to such film advance, preferably the ancillary data is entered, via keybord 40, which corresponds to the item 38 whose universal product type code has been recorded on front surface 24b with this ancillary data, as previously mentioned, being recorded on the back surface 24a adjacent the recorded universal product type code which corresponds thereto. As will also be described in greater detail hereinafter, this ancillary data is also preferably recorded using ambient light via the fiber optics 58 although the ancillary data images are preferably directly recorded via the ambient light. Preferably a complete cycle or transaction of market survey data is comprised of a recording of the bar code or universal product type code information as well as the ancillary data or other relevant statistics associated with that market item 38.

The keyboard 40, as was previously mentioned, preferably provides the ancillary data which is generally required in market research activity to collect and record data about the number of units purchased or consumed, the purchase price, date of purchase, etc. necessary for a complete product history, whereas the universal product type code normally only typically reveals brand and manufacturer. FIG. 4 illustrates the preferred method of recording such ancillary data in which single strands of the fiber optic bundle 58, one such strand 58a being illustrated in FIG. 4, carry the ambient light which is switched by the individual keys 70, one such typical key 70a being illustrated in FIG. 4, to the backside 24a of the storage medium 24. As was previously mentioned, unique pattern images are preferably associated with each key 70 in the keyboard 40 so as to record a unique image on the storage medium 24 to enable determination of which key 70 had been depressed. For example, when the key 70a corresponding to the numeral 4 is depressed, an opening 72 in an otherwise opaque plate 74 is interposed in a gap 76 between the light carrying fiber optic strand 58a portion 59a which is exposed to the ambient light and the portion 59b which extends between the opaque plate 74 and the back side 24a of the storage medium 24. Thus, ambient light will be transmitted to the film with the aforementioned unique image being contained on a mask interposed in the opening 72 or, alternatively, with the mask being interposed between the end of the fiber optics strand 58a and the back side 24a of the storage medium 24. By way of illustration, a typical unique pattern image for each of the numerics 0 through 9 and for an erase or delete function, which also may be provided on the keyboard 40, is illustrated below:

1. ∫
2. ∟
3. ∆
4. ☐
5. ⌈
6. ⌂
7. ⌉
8. ■
9. ⊔
0. — delete ×

Preferably, as one key 70 after another is depressed on keyboard 40, the fiber optic bundle 58 is mechanically displaced across the back side 24a of the film 24 so that the spacing out of the images of the digits across the back side 24a of the film 24 is a recording of the sequence in which the keys 70 were activated. Alternatively, if desired, an electronic light emitting diode display may be provided up against the back side 24a of the film 24 and as the keys 70 are depressed, symbols representing these keys 70 would be displayed on the light emitting diode array with these digits being stepped across the array as in any conventional calculator and thus the images would be recorded on the film 24 and would be a recording of the sequence in which the keys 70 were depressed as well as a recording of which individual keys 70 were depressed. However, this alternative approach requires the use of a battery or other power source or other conventional electronics to decode and drive the light emitting diode displays which is not presently preferred in the data collection system of the present invention. The aforementioned delete or erase function which may be provided on the keyboard 40 is preferably provided so that if the user recording the data makes a mistake or feels that the transaction is inaccurate, the delete key can be depressed which will record the image on the back side 24a of the storage medium 24 which will be recognized during interpretation of this data as an indication to disregard all information in that transaction. Preferably, the film 24 is stepped forward in a sufficient amount to enable one transaction after another to be recorded sequentially on storage medium 24 with this forward stepping increment preferably being less than 0.02 inches so that typically 50 transactions could be recorded on an inch of film 24. However, if desired, more film can be employed per transaction so as to insure that the transactions do not overlap or interfere with each other in the decoding process.

As was previously described, light sensitive photographic emulsions are present either on paper or film on both sides 24a and 24b of the storage medium 24 which is used to record the collected data. For example, if desired Kodabromide photographic paper number CAT 143 7508 F, commercially available from Eastman Kodak, may be employed to photographically record a universal product type code data such as is illustrated in FIG. 10A. While such a universal type product bar code can be recorded on the photographic emulsion 24 by positioning the emulsion in intimate contact to the bar code itself in the presence of light, as is illustrated in FIG. 5, the interposing of the flexible fiber optics 32 between the image to be recorded and the emulsion 24 is preferably preferred because it facilitates exposure control and the recording of bar codes from round, warped, or contaminated surfaces, such as illustrated in FIG. 6 wherein the fiber optic arrangement 32 is illustrated as being used to record a universal product type code 36 from a cylindrical object 38.

As was previously mentioned, a shutter type arrangement 44, 74 is preferably provided between the bar coding fiber optics 32 and the film surface 24b and between the keyboard fiber optics 58 and the film surface 24a for the purpose of admitting the proper amount of light to the respective film surfaces 24b and 24a. Many different types of such shutter arrangements may be employed without departing from the spirit and scope of the present invention. The presently preferred shutter arrangement employed with respect to both the bar code fiber optics 32 and the keyboard optics 58 is to interpose between the respective fiber optics 32 and 58, and the associated photographic emulsion surface 24b, 24a, respectively, an opaque substance, which can either be rotated or moved vertically, as presently preferred, to reveal a translucent or transparent area so that the light, such as ambient light, passing through the respective fiber optic bundles 32 and 58 can fall onto the appropriate film surface 24b or 24a, respectively, as illustrated in FIGS. 7, 8, 8A, 8B and 8C. Referring to FIG. 7, a shutter arrangement comparable to the shutter arrangement 44–52 illustrated in FIG. 3 is shown wherein a flexible light tight ribbon guided by side slots is pushed out from or retracted from shutter housing 44 when the shutter 44–90 is operated. When the shutter 44–90 is closed, this flexible light tight ribbon 90 is preferably nested in portion 54. This is the presently preferred arrangement illustrated in FIG. 1 for use with the bar code fiber optics 32.

As illustrated in FIG. 8, 8A, 8B and 8C, an alternative shutter arrangement is illustrated in which a light transmitting medium 92 having a translucent or transparent area 92a surrounded by an opaque area 92b is rotated so as either to expose this translucent or transparent area 92a to a light source, such as ambient light, or to close off this area 92a to such light. FIG. 8A illustrates this shutter medium 92, with FIG. 8B illustrating the shutter medium 92 disposed horizontally so as to admit light to the film surface 24b and with FIG. 8C showing the shutter medium 92 disposed vertically so as to prevent light from striking the storage medium surface 24b.

Still another alternative arrangement equivalent to the previously described shutter arrangement is illustrated in FIG. 9. In the arrangement of FIG. 9, the storage medium 24 is merely advanced into a safe dark area just subsequent to exposure to light, thus leaving an unexposed portion of film 24 next to the fiber optics 32. This arrangement eliminates the requirement for a moving shutter and simply advances the storage medium 24 a sufficient amount past a window or aperture 96 so that the data being recorded moves on past a light tight boundary 98 to provide exposed film similar to that illustrated, by way of example, in FIG. 9A. In such an arrangement, as the data recorder 20 was moved around in ambient light, the fiber optics 32 would generate all kinds of random light and finally would fully expose the film surface 24b at this space or window 96. However, since in this arrangement the required information would have just been moved on forward to the safe dark area and the next piece of storage medium 24 to be used would not yet have been advanced, the portion wasted would be an intermediate location on the film surface 24b between the last transaction and the next transaction and, thus, no data would be lost.

As was previously mentioned, in all situations where fiber optics are employed, the source of light is preferably picked up as reflected ambient light off the universal product type bar code 36 as described with reference to FIG. 5 or directly as ambient light collected and sent down the fiber optics 58 as they are switched by depressing the various keys 70 on the keyboard 40 as was described with reference to FIG. 4. However, if desired, an auxiliary light source, such as a low voltage set of light emitting diodes 100, may be provided to supply light against the universal product type bar code 36 for enabling the aforementioned reflectance and to supply light down the fiber optics 58 past the key pushbuttons 70 in the event the data recorder 20 is employed where there are very low levels of ambient light, such as in total darkness or moonlight. One advantage of supplying such an auxiliary source of light 100 is that the exposure conditions would be controlled and there would be a mimimal latitude in response to exposures of the film 24, although when the presently preferred ambient light is used as the light source, the exposure time can also be controlled.

The primary concern with exposure time is to provide enough light onto the emulsion 24 to make an image without providing so much light that the images are so over exposed that the entire emulsion is affected thereby washing out or swamping the data to be collected. These requirements, hwever, are not as strict as in conventional commercial photography since in the preferred invention the film media 24 need only be exposed completely or not at all, providing an on/off type of situation in which the fine gradation of the grey areas or colors traditionally used in photography need not be considered. Therefore, in the presently preferred method and apparatus of the present invention, the storage medium 24 is only over exposed slightly since any of the data sought can be captured with relatively low levels of light. Once the molecular structure of the emulsion is changed by the impinging light, it is self-limiting in that it is fully exposed and does not become exposed any greater since all of the molecules have been activated to their maximum extent. However, this self-limiting exposure may not sufficiently attenuate the activity for extremely bright or long exposed amounts of light and, accordingly, other alternative approaches may be employed. For example, the fiber optics bundle 32 can have multiple layers with each subsequent layer transmitting light less efficiently such as as a result of doping the fibers themselves. Under such circumstances, multiple layers of the image will be photographically recorded on the film 24, such as by recording six images, one above the other. By successively attenuating the light going through the fiber optics 32, each of these levels or multiple layers could be an order of magnitude more attenuated than the one below it so that with six orders of magnitude of latitude this would provide at least one of the exposures made by the six individual levels which would be optimal with the one on each side of it probably still being readable. Another alternative method would be to provide gradients of exposure speed on the film media 24 itself so that the fiber optics 32 would display the light across all this gradient and at some point on the film media 24 the proper exposure speed would be available. Still another alternative would be to provide a photo-sensitive coating over the film media 24 so that after the proper amount of light had been transmitted through the coating, the coating itself would become opaque thus limiting any further exposure. Another alternative would be to accelerate the film media 24 past the end of the fiber optics 32 with a constant acceleration thereby providing a constantly increasing velocity. By starting out slowly and finishing fast, the proper amount of light per unit time would be falling for any light level on some portion of the film at some point during that range of velocities with that point giving the correct exposure. Still another alternative is to provide a traditional shutter between the fiber optics 32 and the film 24 which is controlled by ambient light feedback such as a conventional photocell and control system which closes the shutter in accordance with the amount of ambient light present. However, this approach has inherent complexity and would increase the cost of the system for the present invention. A further method is to position the fiber optics 32 so that when they put the light on their output end in a geometric pattern such as illustrated in FIG. 10 which shows how the light nearest the fiber optics 32 is brightest on the emulsion but that further away this light decreases in accordance with the inverse square law of light diffusion thereby providing some point on the emulsion 24 where the exposure is optimum.

Preferably, in accordance with the presently preferred method of the invention, once a roll of photographic film 24 has captured or recorded relevant market survey data for typically 500 or 1000 items, with enough recording space being provided therein for accomplishing this, it is then removed from the data recorder 20. This film 24 is preferably contained in its own mailable cartridge or, if it is self developing film, it may be removed and mailed or delivered to a central office for analysis. In the case of film which requires subsequent development, which is the presently preferred commercial embodiment, the film storage cartridge in the recorder 20 keeps the film 24 in a light tight environment while it is removed and during shipments prior to development. The presently preferred method of data reduction and analysis is illustrated in FIG. 11, which was previously described. Thus, at the central office, conventional methods of film developing may be employed such as by using Kodak Dektol developer having a development time of about four minutes for the aforementioned Kodabromide photographic paper. Thereafter, a water stop bath may be employed and finally a fixer, such as Kodak Rapid Fix for four minutes with the film 24 then being washed to produce the photographic recording of the information, such as the bar code illustrated in FIG. 10A. Preferably, prior to transmitting the film cartridge to the panel members who would be recording the market survey data, the film cartridge is precoded or prenumbered so as to identify the source of the recorded data when the film 24 is returned to the central office. This is important with reference to market survey information as it is important to match demographics, geographic locations, etc. to the market survey information. Alternatively, the data recorder 20 may be utilized to have the panel member insert a unique identification number on the film storage medium 24 at the time of data collection. The recorded images on the photographic emulsion 24 may preferably be decoded by scanning at the central office by conventional bar code scanners after the information has been developed. In the alternative, a conventional light pen may be employed for scanning the developed image at a constant velocity to enhance the accuracy of the subsequent computer decoding of the analyzed data or, alternatively, a magnified image of the developed image may be displayed via a closed circuit television camera. If this method is employed, once such an image is displayed in a conventional television raster format, it can be analyzed by conventional and existing features analysis programs such as employed with many conventional main frame computers.

The presently preferred method of data analysis is to analyze these magnified features expressed in a television raster format by means of a compatible microprocessor such as the RCA Cosmac Video Interface Processor commercially available from RCA Corporation, with the actual analysis of the scanned images being accomplished in computer memory. If it is desired to view this information being analyzed, a conventional television monitor may be connected to the microprocessor, such as an RCA monitor model TC-1209. In this mode, memory bits which are turned on appear as white blocks in the television display and bits which are turned off appear as black blocks in the television display.

Whichever analysis system is employed, the computer system connected to accomplish this will preferably produce the numeric code corresponding to the universal product type code or other bar code information, as well as the units, date and other statistical information that was included in each transaction via the keyboard 40 images. Thus, a computer readable file, such as one storable on magnetic tape, will be produced for subsequent computer analysis.

If desired, the fiber optics can be terminated on a series or linear strip of conventional photo-sensitive electronic devices, such as photo-transistors or other light sensitive electronic devices such as photo-multipliers. In such an instance, each of these devices would preferably have their respective signal outputs amplified by conventional methods of solid state amplification, such as normally employed in connection with large scale intergration. FIG. 12 illustrates such an arrangement in which the fiber optics, for example, fiber optic bundle 32, is terminated in a conventional phototransistor array 110, subsequently conventionally amplified via amplifiers 112 and presented to a conventional shift register 114. This shift register 114 would then preferably be electronically stepped to produce data in a conventional serial format which can then be treated similarly to that which would be conventionally produced by the decoded analogue signal provided from a conventional bar code scanner. Such an arrangement is equivalent to a static representation at the input end of a scanner and the scanning is then accomplished electronically by shifting through the shift register.

As was also previously mentioned with reference to FIG. 1, since the operator in using the data recorder 20 may be required to enter various types of data in a pre-arranged order, a prompting system 60 is preferably provided. For example, the operator may be required to first enter the universal product type bar code 36 via the fiber optic bundle 32, then to enter the date, then enter the units of the item that are there, and the price paid or value of the item, as well as any other statistical information which might be required, all of which would be entered via keyboard 40. Since these various items are to preferably be recorded in a pre-arranged sequence to facilitate analysis, the operator normally has to be prompted as to which item is to be recorded at any given time. This may be accomplished by a conventional mechanical arrangement which moves a printed message beneath a viewing window similar to the method in which digits are displayed one after the other in a digital clock, and this is the arrangement illustrated in FIG. 1.

Alternatively, a mechanical window mechanism 120 (FIG. 13) may move down a list of such items revealing one after the other to prompt or remind the operator which specific piece of data is to be entered next. Such an arrangement is illustrated in the alternative embodiment 20a of the data recorder 20 illustrated in FIG. 13, with the embodiment 20a of FIG. 13 preferably being a wall-mounted unit. This mechanical window mechanism 120 would be advanced or moved down the list, in the direction of arrow 142, based on and triggered by the operator's action at the end of each just entered piece of data. As shown and preferred in FIG. 13, as the mechanical window mechanism 120 moves down the list in the housing 140 of the recorder 20a, the operator is required to push a control button 122 just subsequent to entering unit, price, etc., and after each such depression of the key 122, the mechanical window mechanism 120 automatically advances by a conventional mechanical linkage, such as a ratchet mechanism, down to the next area to expose the next category in the viewing window 124.

The mechanical window 120 is preferably guided along a pair of rails 130 and 132 by guide wheels 134 and 136, respectively, with the keyboard 40 preferably being carried along with the moving mechanical window 120. The associated fiber optics 32 preferably pile up in the lower part of the housing 140 as the window mechanism 120 moves downward in the direction of arrow 142. The aforementioned mechanical movement in connection with key or push button 122 is preferably accomplished by the previously mentioned conventional ratchet mechanism which moves the mechanical window arrangement 120 downward each time the key 122 is depressed to a position along the tracks 130-132 which places the next prompting instruction or category 150 in the window 124.

If desired, instead of a mechanical prompting mechanism, an electronic display such as a conventional LED 7 segment display driven by a stored program may be employed. However, such an electronic arrangement will inherently increase the cost of the unit and is not presently preferred.

If necessary, an image enhancement system such as a lens, concentraters, or controlled ambient lighting can be employed where the environmental surroundings require such additional assistance to ambient lighting and the accuracy of the fiber optics. With respect to the fiber optics, in order for the fiber optics to have sufficient resolving power to detect the difference between wide and narrow lines generally used in universal type product bar codes, the fiber optics must preferably be small enough in diameter that at least one of the fiber optics in the fiber optic bundle covers the smallest lines to be scanned. For example, as illustrated in FIG. 14, an overlay of a band of fibers is employed that is small enough to delineate between the narrowest bar 36a and the widest bar 36b in the bar code 36 to be recorded. In addition, if desired, some mechanical magnification may be achieved by cross-packing the fiber optic strands at the end of the fiber optic bundle at which the bar code is picked up, and then spreading them out at the film end so as to widen the display thus mechanically magnifying it to pick up the dark and light details, such as illustrated in FIG. 15, with such an arrangement being employed if such increased resolution is required.

By utilizing the method and apparatus of the present invention, market survey data from universal product type coded items may be readily recorded.

What is claimed is:

1. A market survey data collection lenseless data recorder for universal product type code encoded market data, said data recorder comprising a housing, said housing having a first exposure aperture therein for admitting a source of light therethrough, a photographic recording medium disposed in said housing adjacent said first exposure aperture, means for controllably advancing said photographic recording medium past said first exposure apert for optically aligning a different predetermined portion of said photographic recording medium with said first exposure aperture each time said medium is advanced, said first exposure aperture being optically alignable with a universal product type code on a market item for which said survey data is to be collected, means for enabling reflective photographic recording of said universal product type code data on said medium for said market item in response to the reflection of the image of said universal product type code on to said medium through said first exposure aperture when exposed to said light source, and means disposed in said housing for enabling insertion and photographic recording of ancillary market survey data on said photographic recording medium corresponding to said market item adjacent said photographically recorded universal product type code, said ancillary data insertion and recording means comprising means for enabling direct photographic recording of said inserted ancillary market survey data in response to direct provision of an image corresponding to said inserted ancillary data on to said medium when exposed to said light source, said ancillary data recording means comprising a keyboard means for selectively inserting said corresponding ancillary data, said keyboard means comprising a plurality of keys each capable of providing an unique photographically recordable code designation image to said medium for selectively inserting said ancillary data to be recorded thereon, said ancillary data recording enabling means enabling said direct photographic recording of said selectively inserted code designation images on to said medium when exposed to said light source, said keys each comprising a second exposure aperture associated therewith for defining said unique ancillary data code image for each of said keys when said key is enabled for selectively inserting said unique code designation image on to said medium, said ancillary data photographic recording enabling means further comprising a first bundle of fiber optics optically alignable between said ancillary data code image producing keys and said photographic recording medium and selectively exposable to said light source through each of said key second exposure apertures for directly photographically recording said selectively inserted corresponding ancillary data when said key is enabled.

2. A market survey data recorder in accordance with claim 1 wherein said photographic recording medium is capable of photographically recording on opposite sides thereof, said ancillary data recording means being disposed in said housing for enabling said ancillary data to be photographically recorded on the opposite side of said recording medium from said corresponding universal product type code for said market item, whereby said recorded ancillary data and said recorded universal product type code data are adjacent.

3. A market survey data recorded in accordance with claim 1 wherein said means for enabling said reflective photographic recording of said universal product type code comprises shutter means for selectively admitting said light source through said first exposure aperture to expose said reflected image on said medium.

4. A market survey data recorder in accordance with claim 3 wherein said data recorder further comprises trigger means interconnecting said medium advancing means and said shutter means for simultaneously controlling said medium advance and selective exposure.

5. A market survey data recorder in accordance with claim 1 wherein said ancillary data insertion and recording means further comprises means for enabling insertion of said ancillary data corresponding to different market survey parameters at different defined positions on said photographic recording medium.

6. A market survey data recorder in accordance with claim 1 wherein said means for enabling said reflective photographic recording of said universal product type code data comprises a second bundle of fiber optics optically alignable with said first exposure aperture and said universal product type code to be recorded, whereby said universal product type code is reflectively photographically recorded and said ancillary data is directly photographically recorded.

7. A market survey data recorder in accordance with claim 6 wherein said light source comprises ambient light.

8. A market survey data recorder in accordance with claim 6 wherein said light source comprises artificial light.

9. A market survey data recorder in accordance with claim 6 wherein said second fiber optic bundle is flexible.

10. A market survey data collection lenseless data recorder for universal product type code encoded market data, said data recorder comprising a housing, said housing having an exposure aperture therein for admitting a source of light therethrough, a photographic recording medium disposed in said housing adjacent said exposure aperture, means for controllably advancing said photographic recording medium past said exposure aperture for optically aligning a different predetermined portion of said photographic recording medium with said exposure aperture each time said medium is advanced, said exposure aperture being optically alignable with a universal product type code on a market item for which said survey data is to be collected, means for enabling reflective photographic recording of said universal product type code data on said medium for said market item in response to the reflection of the image of said universal product type code on to said medium through said exposure aperture when exposed to said light source, and means disposed in said housing for enabling insertion and photographic recording of ancillary market survey data on said photographic recording medium corresponding to said market item adjacent said photographically recorded universal product type code, said photographic recording medium being capable of photographically recording on opposite sides thereof, said ancillary data recording means being disposed in said housing for enabling said ancillary data to be photographically recorded on the opposite side of said recording medium from said corresponding universal product type code for said market item, whereby said recorded ancillary data and said recorded universal product type code data are adjacent, said means for enabling said reflective photographic recording of said universal type code data comprising a first bundle of fiber optics optically alignable with said exposure aperture and said universal product type code to be recorded, said ancillary data recording means comprising a keyboard means for selectively inserting said corresponding ancillary data and means for enabling photographic recording of said selectively inserted corresponding ancillary data on said photographic recording medium, said keyboard means further comprising prompting indicator means for alerting the user of the keyboard to a predetermined sequence of insertion and recording of said market survey data on said photographic recording medium.

11. A market survey data collection lenseless data recorder for universal product type code encoded market data, said data recorder comprising a housing, said housing having an exposure aperture therein for admitting a source of light therethrough, a photographic recording medium disposed in said housing adjacent said exposure aperture, means for controllably advancing said photographic recording medium past said exposure aperture for optically aligning a different predetermined portion of said photographic recording medium with said exposure aperture each time said medium is advanced, said exposure aperture being optically alignable with a universal product type code on a market item for which said survey data is to be collected, means for enabling reflective photographic recording of said universal product type code data on said medium for said market item in response to the reflection of the image of said universal product type code on to said medium through said exposure aperture when exposed to said light source, and means disposed in said housing for enabling insertion and photographic recording of ancillary market survey data on said photographic recording medium corresponding to said market item adjacent said photographically recorded universal product type code, said ancillary data recording means comprising a keyboard means for selectively inserting said corresponding ancillary data and means for enabling photographic recording of said selectively inserted corresponding ancillary data on said photographic recording medium, said keyboard means comprising prompting indicator means for alerting the user of the keyboard to a predetermined sequence of insertion and recording of said market survey data on said photographic recording medium.

* * * * *